United States Patent [19]

Newman

[11] Patent Number: 5,245,603
[45] Date of Patent: Sep. 14, 1993

[54] HIGH-SPEED DETERMINING UNIT FOR PRIORITIZING AND ARBITRATING AMONG COMPETING INPUT SIGNALS

[75] Inventor: Peter Newman, Mountain View, Calif.

[73] Assignee: Network Equipment Technologies, Inc., Redwood City, Calif.

[21] Appl. No.: 712,960

[22] Filed: Jun. 10, 1991

Related U.S. Application Data

[63] Continuation-in-part of Ser. No. 602,409, Oct. 22, 1990, Pat. No. 5,222,085, and a continuation-in-part of Ser. No. 582,254, Sep. 14, 1990, abandoned, and a continuation-in-part of Ser. No. 258,291, Oct. 14, 1988, Pat. No. 4,965,788.

[30] Foreign Application Priority Data

Oct. 15, 1987 [GB] United Kingdom ............... 8724208
Oct. 13, 1988 [GB] United Kingdom ............... 8824058

[51] Int. Cl.[5] .................... H04Q 11/00; H04L 12/56
[52] U.S. Cl. .................................. 370/54; 370/60;
370/85.2; 370/85.6; 370/94.1; 340/825.02;
340/826; 340/825.5; 379/271
[58] Field of Search .............. 370/53, 54, 58.1, 58.2,
370/58.3, 60, 60.1, 65, 85.1, 85.2, 85.6, 94.1;
340/825.02, 825.03, 826, 825.5, 825.51, 825.52,
825.79, 825.8; 379/268, 271, 272

[56] References Cited

U.S. PATENT DOCUMENTS

| | | | |
|---|---|---|---|
| 4,482,996 | 11/1984 | Wilson et al. | 370/60 |
| 4,488,151 | 12/1984 | Bolton et al. | 370/85.1 |
| 4,570,162 | 2/1986 | Boulton et al. | 370/60 |
| 4,621,359 | 11/1986 | McMillen | 370/94.1 |
| 4,630,260 | 12/1986 | Toy et al. | 370/94.1 |
| 4,661,947 | 4/1987 | Lea et al. | 370/94.1 |
| 4,707,831 | 11/1987 | Weir et al. | 370/94.1 |
| 4,731,878 | 3/1988 | Vaidya | 370/60 |
| 4,734,907 | 3/1988 | Turner | 370/94.1 |
| 4,763,329 | 8/1988 | Green | 340/825.02 |
| 4,764,919 | 8/1988 | Hunter et al. | 370/60 |
| 4,796,023 | 1/1989 | King | 340/825.02 |

FOREIGN PATENT DOCUMENTS 2151880 7/1985 United Kingdom .

OTHER PUBLICATIONS

"Binary Routing Network", Milway, D. R., U. of Cambridge Computer Lab., Tech. Report No. 101, Cambridge, England, Dec. 1986, (Entire document).
"Multiple Bus Architectures", T. W. Madge et al., Computer vol. 20, No. 6, Jun. 1987, pp. 42-48, published by the Computer Society of the IEEE.

Primary Examiner—Douglas W. Olms
Assistant Examiner—Alpus H. Hsu

[57] ABSTRACT

A determining unit in a computer, communication of other system for determining which one of a plurality of requests by competing input signals is to be honored. The determining unit includes a priority and an arbiter unit with a plurality of stages of arbiter blocks cascaded together from arbiter blocks in a first stage to arbiter blocks in a last stage in a binary tree. The forward output signals from blocks in one stage connect as forward input signals to blocks in a next stage and reverse output signals from blocks in one stage connect as reverse input signals to blocks in a previous stage.

25 Claims, 4 Drawing Sheets

HIGH-SPEED DETERMINING UNIT FOR PRIORITIZING AND ARBITRATING AMONG COMPETING INPUT SIGNALS

"This is a continuation-in-part of the application Ser. No. 07/602,409, filed Oct. 22, 1990, now U.S. Pat. No. 5,222,085, a continuation-in-part of the application Ser. No. 07/582,254, filed Sep. 14, 1990, now abandoned, and a continuation-in-part of the application Ser. No. 07/258,291, filed Oct. 14, 1988, now U.S. Pat. No. 4,965,788."

BACKGROUND OF THE INVENTION

The present invention relates to a high-speed determining unit having priority and arbitration useful with computers, fast packet switches and other communication switches, and other systems.

This application is a continuation-in-part of the above-identified cross-referenced application Ser. No. 07/602,409. In computer, communication, and other electronic systems, the condition often arises where a plurality of competing requests are made for access to one or more resources, but the resources cannot during any given time period, accommodate all of the requests. When such a condition arises, there is a need to determine which one or more of the requests is to be honored.

The algorithms for, and corresponding methods of and apparatus for, determining which one or more requests among a plurality of competing requests will be honored have been implemented in many ways. The determination of which request is to be honored is a matter of arbitrating between competing requests in accordance with an arbitration algorithm.

One example of an arbitration algorithm is a "first come first served" (FCFS) algorithm. Such a FCFS algorithm is useful in environments where the competing inputs are presented at different times. However, in synchronous systems where many requesting inputs occur during the same common time interval, the FCFS algorithm is not always satisfactory.

Another example of an arbitration algorithm is a "round robin" algorithm where the competing inputs are honored in a regular and sequential order. Such an algorithm is useful where the competing inputs are accorded equal weight, but the algorithm does not permit the competing inputs to be honored based upon a predetermined priority.

Algorithms exist in which some competing requests are accorded higher priority than others of the competing requests. With such priority algorithms, competing inputs of higher priority are honored before competing requests of lower priority.

While many algorithms exist for determining which one or more requests among a plurality of competing requests will be honored, embodiments of those algorithms in useful circuits have not always been satisfactory particularly when high-speed operation is required.

Accordingly, there is a need for improved methods and apparatus capable of high-speed operation for determining which one or more requests among a plurality of competing requests will be honored in a computer, communication or other system.

SUMMARY OF THE INVENTION

The present invention is a determining unit for determining which one of a plurality of requests represented by competing input signals is to be honored. The determining unit includes an arbiter unit having a plurality of stages of arbiter blocks cascaded together from arbiter blocks in a first stage to arbiter blocks in a last stage. Each arbiter block has forward logic circuits for sensing one or more forward input signals to provide a forward output signal and reverse logic circuits for propagating a reverse input signal as a single reverse output signal which identifies the honored one of the input requests.

The plurality of stages of arbiter blocks are connected in a tree wherein the forward output signals from blocks in one stage connect as forward input signals to blocks in a next stage, wherein reverse output signals from blocks in one stage connect as reverse input signals to blocks in a previous stage, and wherein only a single forward output signal connects to a single reverse input signal for the last stage.

The arbiter unit operates by propagating the competing signals input to the first stage in the forward direction and by enabling propagation in the reverse direction through the stages providing one reverse output signal from one arbiter block in the first stage thereby determining which one of the plurality of competing input signals is to be honored.

The arbiter unit includes reverse selection circuits in each arbiter block responsive to a single forward input signal for selecting a corresponding single reverse output and responsive to a preference signal when more than one forward input signal is present to select a single reverse output. A preference unit provides the preference signals to the arbiter blocks to enable reverse selection when more than one forward input signal is present. The state of the preference signals are changed in accordance with different algorithms. In one embodiment, the preference signals are changed so as to tend over a period of time to randomly select reverse outputs when more than one input is present.

In one embodiment, the determining unit includes a priority unit for receiving the competing request signals together with corresponding priority signals. The priority unit operates to provide prioritized request signals including only request signals of the same priority level as the highest priority level then being asserted.

In one self-routing communication system embodiment, the determining unit selects packet signals from one of a plurality of competing packet signal inputs for connection to a packet output.

In one computer system embodiment, a plurality of computer units are connected together by a common bus and the determining unit determines which one of a plurality of competing bus request input signals from the computer units is to be honored so as to thereby grant bus access to the selected computer unit.

Other objects, features, and advantages of the present invention will become more apparent in the light of the following detailed description thereof, as illustrated in the drawings.

DETAILED DESCRIPTION OF THE DRAWINGS

Figure 1:
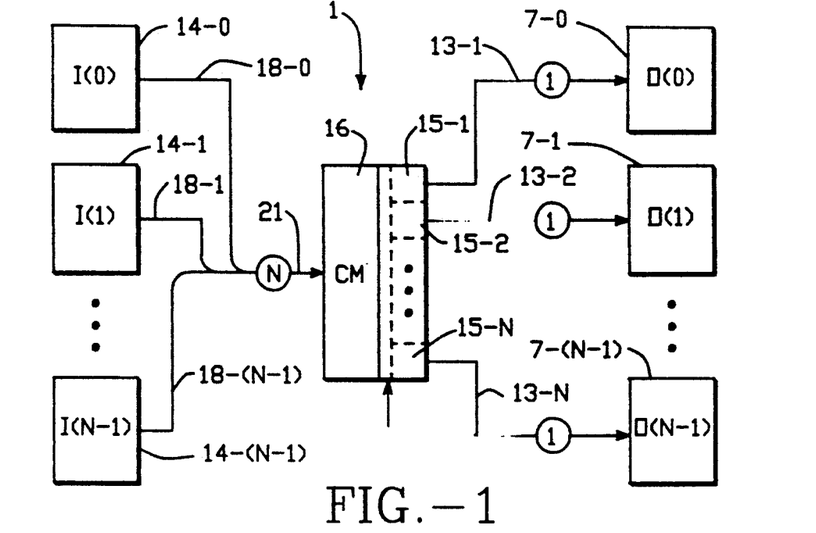
FIG. 1 depicts a system with input units connected by a connection unit and selector units to output units.

High-Speed System—FIG. 1

In FIG. 1, high-speed system 1 includes selector units 15 each having determining units with priority and arbitration, or arbitration alone, for determining which one of the competing input units 14 is to be honored. The input units 14 with competing input signals connect over the bus 21, formed of the N input buses 18-0, 18-1, 18-(N-1), respectively, to connection means (CM) 16. The connection means 16 connects to each of the N selector units 15-0, 15-1, . . . , 15-(N-1 . The selector units 15 connect, respectively, to the N output buses 13-0, 13-1, . . . , 13-(N-1) which in turn connect to the N output units 7-0, 7-1, . . . , 7-(N-1).

The high-speed system 1 of FIG. 1 operates such that each of the selector units 15 selects and connects competing input signals from one of the input units 14 to one of the output units 7. For each output unit 7 any one of the input units 14 can be connected.

Figure 2:
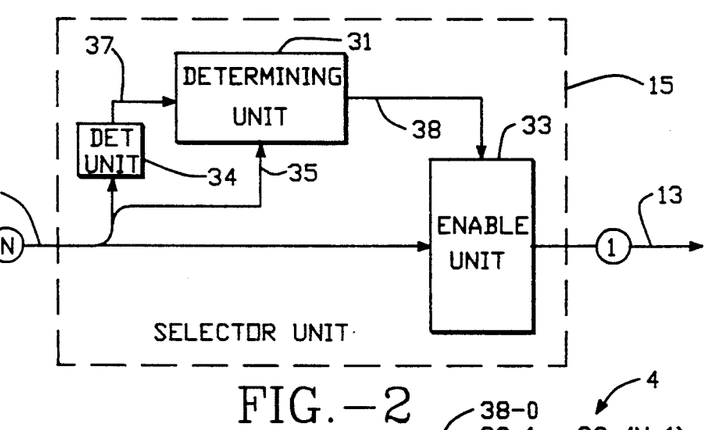
FIG. 2 depicts a typical selector unit, including a priority and arbitration determining unit, which forms part of the system of FIG. 1.

Selector Unit—FIG. 2

In FIG. 2, a typical one of the selector units 15 of FIG. 1 is shown. Each selector unit 15 receives the N buses 18 as the N-bus input bus 21 and connects one of the buses 18 to the output bus 13. Each selector unit 5 includes a detector unit 34 which detects if the particular one of the selector units 15 is being addressed by one of the inputs 14. Typically, each input 14 provides a tag field on bus 18 unique to one of the selector units 15. When the detector unit 34 detects its unique tag, the selector unit 15 is enabled with inputs to the determining unit 31. The determining unit 31 determines which one of the N input buses 21 is selected for connection to the output 13 using high-speed priority and arbitration circuits or arbitration circuits alone. The determining unit 31 receives input buses 37, which are part of buses 8 and which have input signals indicating which ones, if any, of the inputs 4 are active. The determining unit 31 also receives input buses 35 which are part of buses 18 and which have priority signals to indicate the priority level of the input signals from input units 14. The determining unit 31 provides output lines 38 which signal which one, if any, of signals from the input units 14 is selected to provide output signals.

Fast Packet Switching Embodiment

One embodiment of the high-speed system 1 of FIG. I is shown and described in the above-cross-referenced U.S. application Ser. No. 07/602,409 entitled SELF-ROUTING SWITCHING ELEMENT AND FAST PACKET SWITCH. In that embodiment, a fast packet switching communication system combines features of circuit switching and packet switching into a single integrated switching communication system which employs high-speed determining units using priority and arbitration to determine which one among competing input signals is to be honored. Further details of the communication system embodiment appear in cross-referenced application Ser. No. 07/602,409 and such details are hereby incorporated by reference in this application.

Figure 3:
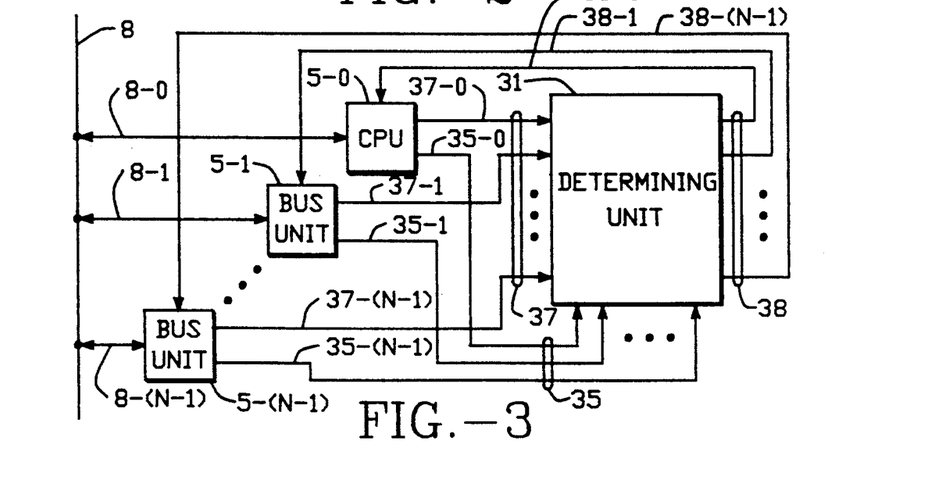
FIG. 3 depicts a computer system embodiment employing a determining unit.

Computer System Embodiment—FIG. 3

In FIG. 3, a computer system 4 employs, in part, the high speed system of FIG. 1. The computer system 4 includes, for example, a conventional processor (CPU) bus unit 5-0 and one or more I/O or other bus units 5-1, . . . , 5-(N-1). The units 5-0, . . . , 5-(N-1) each connect to a common bus 8 via the buses 8-0, 8-1, . . . , 8-(N-1). The computer system 4 of FIG. 3 includes a determining unit 31 like the determining unit 31 of FIG. 2. Each of the bus units 5-0, . . . , 5-(N-1) requests access to the bus 8 by asserting a request input signal on a corresponding request input line 37-0, 37-1, . . . , 37-(N-1). Also, each of the bus units 5-0, . . . , 5-(N-1) also has a priority bus 35 which provides a priority signal on the corresponding priority buses 35-0, 35-1, . . . , 35-(N-1). The determining unit 31 determines which ones of the bus units 5 are asserting a request input signal as an active signal on one of the lines 37. Among the requesting units with asserted lines 37, the determining unit based on the priority from lines 35 selects one of the bus units 5 to be granted access to the bus 8. The grant selection signal appears output from the determining unit 31 on one of the grant lines 38-0, 38-, . . . , 38-(N-1). The one of the output lines 38 which is enabled with a grant output signal enables the corresponding bus unit 5 to gain access to the bus 8.

The priority and arbitration circuits are employed in computer systems requiring access where conventional techniques are too slow.

Figure 4:
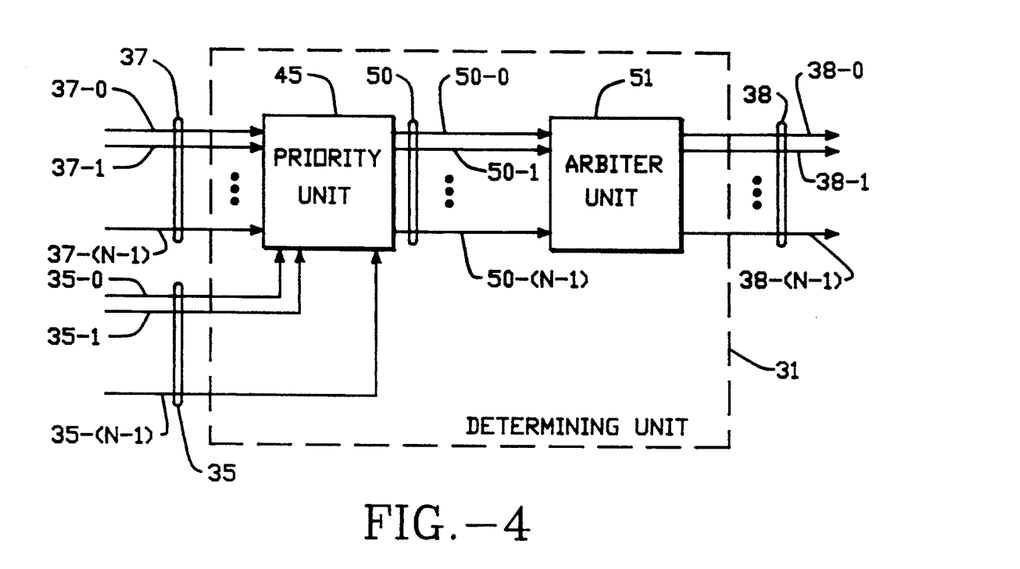
FIG. 4 depicts a determining unit which is part of the selector unit of FIG. 2.

Determining Unit—FIG. 4

In FIG. 4, the determining unit 31 within the selector unit 15 of FIG. 2 is shown in further detail. The determining unit 31 includes a priority unit 45 and an arbiter unit 51. The priority unit 45 receives the input bus 37 including the lines 37-0, 37-1, . . . , 37-(N-1) derived from the input units 14 of FIG. 1. One or more of the lines 37 may be asserted thereby providing competing input signals which compete for access to any particular one of the selector units 15 of FIG. 1. Accordingly, from 0 to N of the input lines 37 may be asserted when none or up to N of the input units 14 are requesting a particular selector unit 15 of FIG. 1.

In FIG. 4, the bus 35 is formed by the N buses 35-0, 35-1, . . . , 35-(N-1). Bus 35-0 contains the priority information derived from the bus 18-0 of FIG. 1. Similarly in FIG. 4, the bus 35-1 contains the priority information from the bus 18-1 of FIG. 1. The bus 35-(N-1) in FIG. 4 includes the priority information from the bus 18-(N-1) of FIG. 1.

Each of the priority buses 35-0, 35-1, 35-(N-1) includes one or more priority bits which define a priority level for the input unit 14. The priority unit 45, for each one of the inputs on line 37 requesting access to the selector unit 15, checks the corresponding priority for the requesting input on the corresponding one of the priority buses 35. The one or more requesting inputs on line 37 having the highest priority cause outputs to be asserted on a corresponding one or more of the output lines 50. Specifically, if the input line 37-0 indicates that the input 18-0 and input module 14-0 of FIG. 1 have an input signal competing for a particular one of the selector units 15 of FIG. 1, then the priority unit 45 of FIG. 4 senses that the input line 37-0 is asserted. The priority unit 45 checks the priority level on bus 35-0, which carries the priority level for signals from the input unit 14-0 of FIG. 1. If the priority on bus 35-0 for the requesting signals represented by the asserted line 37-0 is as high as any other priority for other asserted lines 37, then the output line 50-0 is asserted. Similarly, if the priority of a requesting signal on line 37-1, as represented by the priority tag on bus 35-1, is of the priority level as high as any other priority at that time, then the output line 50-1 from the priority unit 45 is asserted. Any number of outputs 50 from 0 to N may be asserted from the priority unit 45.

In FIG. 4, the requesting input signals of the highest priority level then asserted are represented by the signals on lines 50 to the arbiter unit 51. Arbiter unit 51 determines which one or more of the asserted highest priority requesting signals on lines 50 is to be selected. In the particular embodiments described, only one output from the arbiter unit 5 is permitted at a time when more than one of the inputs on lines 50 are asserted. Accordingly, only one of the output lines 38, that is, one of the lines 38-0, 38-1, ..., 38-(N-1), is asserted during a common time period.

By way of example, if the input 50-1 and others of the inputs 50 are asserted, and arbiter unit 51 selects the input 50-1 as the one to be honored by the determining unit 31 within one of the selector units 15 of FIG. 1, then output line 38-1 is asserted and all of the other outputs 38 are not asserted. Accordingly, either one or none of the outputs 38 are asserted during any one common time period and the particular one asserted corresponds to the one of the requesting input signals which is to be accepted (honored) by the selector unit 15 of FIG. 1.

The output lines 38 in FIG. 4 connect to the enable unit 33. The particular one of the asserted outputs from arbiter unit 5 in FIG. 4 selects one of the buses 18-0, 18-1, ..., 18-(N-1) from the input bus 21 to be connected to one of the output buses 13. Enable unit 33 is, for example, a conventional multiplexor having N inputs and one output.

Figure 5:
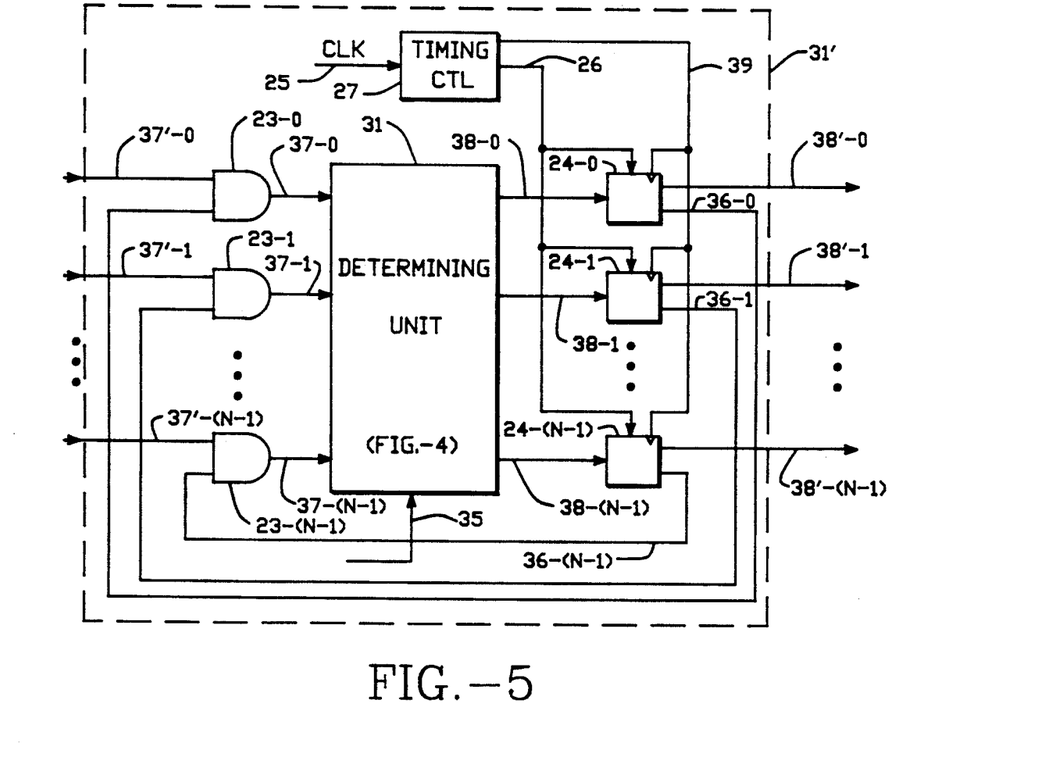
FIG. 5 depicts a latching embodiment of the FIG. 4 determining unit.

Latched Determining Unit—FIG. 5

In FIG. 5, determining unit 31' is an alternate embodiment of the determining unit 31 of FIG. 4. In FIG. 5, the input lines 37'-0, 37'-1, ..., 37'-(N-1) are the same as the inputs 37-0, 37-1, ..., 37-(N-1) of FIG. 4 and in FIG. 5 are input to the AND gates 23-0, 23-1, ..., 23-(N-1). The outputs from AND gates 23-0, 23-1, ..., 23-(N-1) are in FIG. 5 the lines 37-0, 37-1, ..., 37-(N-1) (the same as like-numbered lines in FIG. 4) which are input to the determining unit 31 of FIG. 4. The outputs of the determining unit 31 of FIG. 5 are the outputs 38-0, 38-1, ..., 38-(N-1) in FIG. 5 (the same as for the determining unit 31 in FIG. 4). The outputs 38-0, 38-1, ..., 38-(N-1) in FIG. 5 are input to the latches 24-0, 24-1, ..., 24-(N-1).

The latches 24 each receive a clock input from the CLK line 39 and function to latch the state of the corresponding input line 38. Once set, the latches 24 remain set until a reset signal appears on the reset line 26. The outputs from the latches 24-0, 24-1, ..., 24-(N-1) are the lines 38'-0, 38'-1, ..., 38'-(N-1) which take the place of the lines 38-0, 38-1, ..., 38-(N-1) in FIG. 4. The corresponding inverted outputs from the latches 24 are the lines 36-0, 36-1, ..., 36-(N-1) which in turn connect as inputs to the AND gates 23-0, 23-1, ..., 23-(N-1). When latches 24 are reset by a reset from the reset signal on line 26 from the reset control 27, the outputs 36 are switched to logical ones thereby enabling all of the AND gates 23. Whenever a particular one of the latches 24 is latched by the operation of a clock signal on line 39 and an output on one of the lines 38, the corresponding output 36 from the latch 20 is switched to a logical zero thereby disabling the corresponding AND gate 23. For example, if the output on line 38-1 is a logical one and is clocked into the latch 24-1, the output on line 38'-1 is a logical one and the output on line 36-1 is a logical zero. The logical zero on line 36-1 is input to the AND gate 23-1 and disables AND gate 23- thereby inhibiting any further input on line 37'-1 until latch 24-1 is reset. With AND gate 23-1 disabled, the input on line 37-i of FIG. 5 is a logical zero so that the output on line 38-1 is a logical zero. The output from latch 24-1 on line 38'-1, however, remains a logical one until all of the latches 24 are reset. The operation of the FIG. 5 determining unit is to accept, during a predetermined time period, each of the asserted inputs on lines 37'-0, 37'-1, ..., 37'-(N-1). One of the inputs on lines 37 having the highest priority is selected by the determining unit 31 in FIG. 5 and that selected input becomes latched into one of the latches 24. The one of the latches 24 which has an input latched thereby disables the corresponding AND gate 23 thereby removing that input on lines 37' from the inputs on lines 37 to determining unit 31 of FIG. 5. Next, the determining unit 31, during the same common predetermined time period, determines the input, then among the next highest priority of the remaining inputs on lines 37', to be selected and again latches that selected input into the corresponding latch 24. Again, once the corresponding latch 24 is latched, its output disables the corresponding AND gate 23. Thereafter, the determining unit again determines the next input, among the then highest priority asserted inputs and again sets one of the latches 24 at the next latch signal on the latch line 39.

Timing control 27 is, for example, a conventional counter which issues a latch signal output on line 39 after each one or more input clock signals on line 25 and issues a reset signal on output line 26 after a number of input clock signals on line 25. For example, if four latch signals are issued on line 29 for each reset signal output on line 26, up to four of the latches 24 can become set thereby accepting up to four requests by the asserted signals on lines 38'. The four asserted signals on lines 38' correspond to the four highest priority inputs on lines 37', in the example where up to four requests are accepted. Such multiple outputs from the determining unit are useful, for example, in units which are able to process multiple information signals at a time. While the example described employed selection of four requests, the number of requests can be from 1 to N as a matter of design choice.

Figure 6:
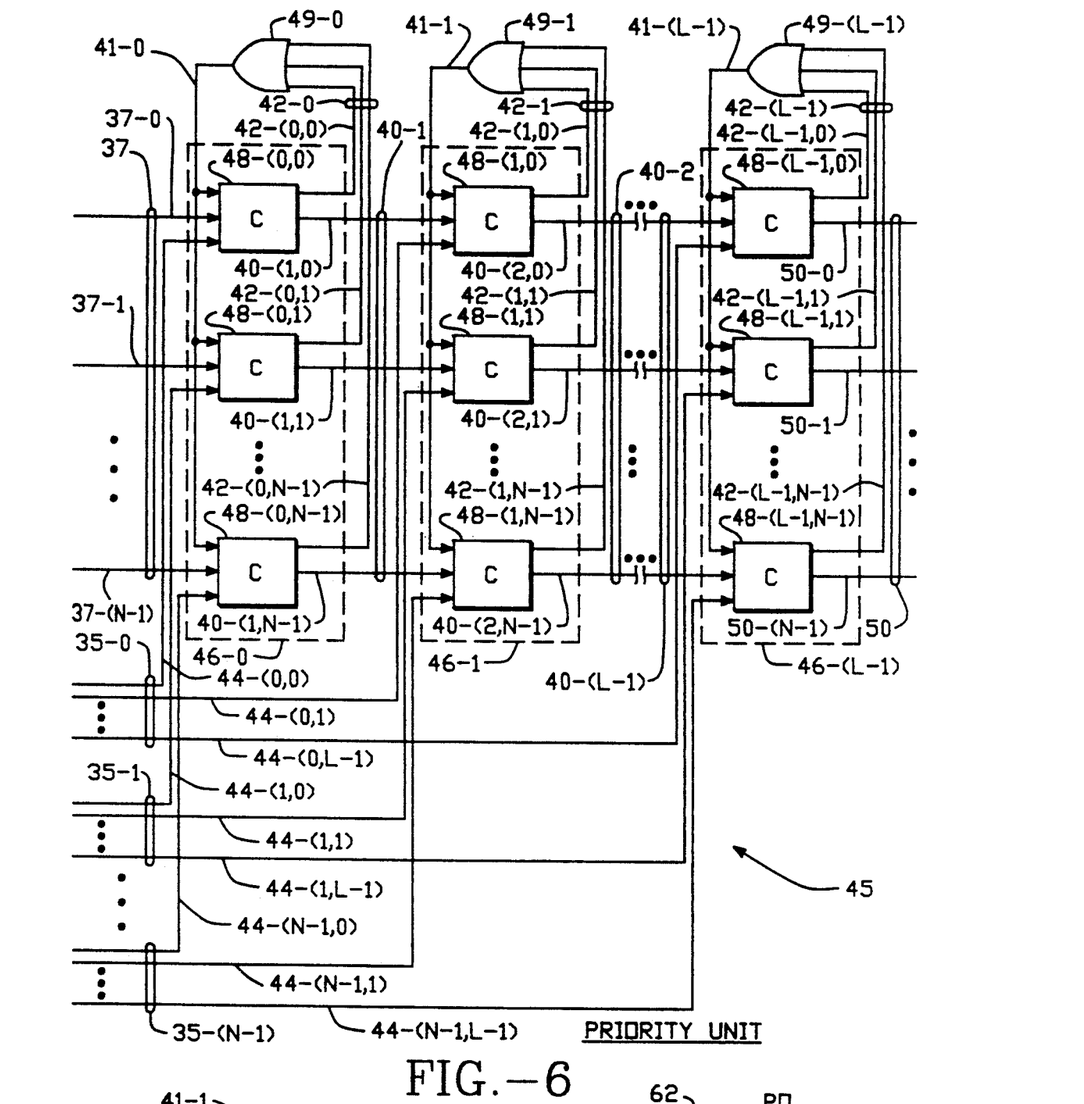
FIG. 6 depicts a parallel priority unit embodiment of the priority unit in the determining unit of FIG. 4.

Priority Unit—FIG. 6

In FIG. 6, further details of a priority unit 45 within the determining unit 31 of FIG. 4 are shown. The priority unit 45 of FIG. 6 receives the input priority buses 35-0, 35-1, ..., 35-(N-1). Each input bus 35 includes lines 44-0, 44-1, ..., 44-(L-1). More specifically, the input lines 44-0, 44-1, ..., 44-(L-1) for the bus 35-0 are designated 44-(0,0), 44-(0,1), ..., 44-(0,L-1). Similarly, for input priority bus 35-1 the priority lines are 44-(1,0), 44-(1,1), ..., 44-(1,L-1) and so on until for the priority bus 35-(N-1) the priority lines are 44-(N-1,0), 44-(N-1,1), ..., 44-(N-1,L-1).

In FIG. 6, the priority unit 45 also includes the active in bus 37 including the active in (AI) lines 37-0, 37-1, ..., 37-(N-1). In FIG. 6, the priority unit includes a plurality of banks 46 of comparators 48 including the most significant bit (msb) bank 46-0, the next most significant bit (nmsb) bank 46-1 and so on to the least significant bit (lsb) bank 46-(L-1). Each bank 46 includes the comparators 48 including comparators 48-0, 48-1, ..., 48-(N-1).

Specifically, the bank 46-0 includes the comparators 48-(0,0), 48-(0,1), ..., 48-(0,N-1). Similarly, bank 46-1 includes the comparators 48-(1,0), 48-(1,1), ..., 48-(1,N-1) and so on until the bank 46-(L-1) includes the comparators 48-(L-1,0), 48-(L-1,), ..., 48-(L-1,N-1).

In FIG. 6, the active out (AO) bus 40-1 from the comparator bank 46-0 connects as the active in (AI) bus to the comparator bank 46-1. Specifically, the active out/active in bus 40-1 includes the active lines 40-(1,0), 40-(1,1), ..., 40-(1,N-1) which connect respectively from the comparators 48-(0,0), 48-(0,1), ..., 48-(0,N-1) to the active in (AI) inputs of the comparators 48-(1,0), 48-(1,1), ..., 48-(1,N-1), respectively. Similarly, the active out (AO) output bus 40-2 from the comparator bank 46-1 connects to the active in (AI) input bus of the next least significant bit comparator bank (46-2, not shown) until finally the active in (AI) bus 40-(L-1) connects as the input to the least significant bit bank 46-(L-1).

In FIG. 6, each of the comparator banks 46-0, 46-1, ..., 46-(L-1) has an associated OR gate 49 including the respective OR gates 49-0, 49-1, ..., 49-(L-1). Each of the OR gates 49 receives an input bus 42 from the corresponding comparator bank 46. Specifically, the OR gates 49-0, 49-1, ..., 49-(L-1) receive the input buses 42-0, 42-1, ..., 42-(L-1), respectively. More specifically, the bus 42-0 includes the lines 42-(0,0), 42-(0,1), ..., 42-(0,N-1) which connect from the comparators 48-(0,0), 48-(0,1), ..., 48-(0,N-1), respectively. Similarly, for OR gate 49-1 the bus 42-1 includes the lines 42-(1,0), 42-(1,1), ..., 42-(1,N-1) and so on until the OR gate 49-(L-1) and the bus 42-(N-1) includes the lines 42-(L-1,0), 42-(L-1,1), ..., 42-(L-1,N-1).

Each of the OR gates 49-0, 49-1, ..., 49-(L-1) provides a respective output 41-0, 41-1, ..., 41-(L-1) which forms a priority sum input (PSI) signal input to each of the comparators 48 in the respective banks 46-0, 46-1, ..., 46-(L-1).

In FIG. 6, the priority input (PI) buses 35-0, 35-1, ..., 35-(N-1) have their most significant bits 44-(?,0) connected as inputs to the comparators in the most significant bit bank 46-0. Specifically, the priority in (PI) input lines 44-(0,0), 44-(1,0), ..., 44-(N-1,0) connect as inputs to the comparators 48-(0,0), 48-(0,1), ..., 48-(0,N-1), respectively, and these comparators similarly receive the active in (AI) inputs 37-0, 37-1, ..., 37-(N-1), respectively. Similarly, each of the next significant bit priority in (PI) lines 44-(0,1), 44-(1,1), ..., 44-(N-1,1) from the input buses 35 connect as inputs to the next most significant bit comparator bank 46-1 and specifically to the comparators 48-(1,0), 48-(1,1), ..., 48-(1,N-1), respectively, which also receive the OR gate PSI line output 41-1 and the active in outputs on bus 40-1 from the comparator bank 46-0. In a similar manner, each of the least significant bit lines from the buses 35 connect to the least significant bit comparator bank 46-(L-1). Specifically, the least significant priority in (PI) lines 44-(0,L-1), 44-(1,L-1), ..., 44-(N-1,L-1) connect as inputs to the comparators 48-(L-1,0), 48-(L-1,1), ..., 48-(L-1,N-1), respectively. Finally, the prioritized active out bus 50 includes the active out (AO) lines 50-0, 50-1, ..., 50-(N-i) from the comparators 48-(L-1,0), 48-(L-1,1), ..., 48-(L-1,N-1), respectively.

Figure 7:
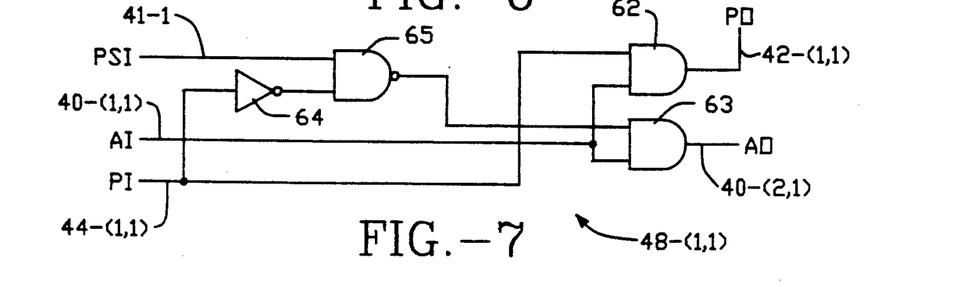
FIG. 7 depicts a typical one of the comparators within the priority unit of FIG. 6.

Comparator—FIG. 7

In FIG. 7, a comparator 48-(1,1) is shown typical of all of the comparators 48 in FIG. 6. In FIG. 7, the comparator 48-(1,1) receives the priority sum input (PSI) on line 41-1, the active in (AI) input on line 40-(1,1), and the priority in (PI) on line 44-(1,1). The comparator 48(1,1) produces the priority out (PO) signal on line 42-(1,1) and the active out (AO) signal on line 40-(2,1). The PSI input on line 41-1 connects to the NAND gate 65 which also receives through invertor gate 64 the PI input on line 44-(1,1). NAND gate 65 provides one input to the AND gate 63 which receives as its other input the AI line 40-(1,1). AND gate 63 provides the AO signal on line 40 (2,1). The AND gate 62 receives the PI input on line 44-(1,1) and the AI input on line 40-(1,1) to provide the PO output on line 42-(1,1).

The operation of the priority unit of FIG.'s 6 and 7 is explained with reference to the following table which represents the operation of each comparator 48 in FIG. 6.

TABLE 1

| AI | PI | PSI | AO |
|----|----|-----|----|
| 1  | 1  | 1   | 1  |
| 1  | 0  | 1   | 0  |
| 1  | 0  | 0   | 1  |
| 0  | —  | —   | 0  |

In TABLE 1, the active in (AI) column represents the input on one of the lines 37 or 40, for example, on line 40-(1,1). The priority in (PI) column represents the priority input, for example, on line 44-(1,1). The priority sum input (PSI) column represents the input derived as the output from one of the OR gates, for example, gate 49-1 on line 41-1 of FIG. 6. The comparator active output (AO) column represents the output from one of the comparators 48, for example, the output from comparator 48-(1,1) on line 40-(2,1).

In FIG. 6, each one of the banks 46 of the priority unit 45 operates to determine if any of the active inputs (AI) to the bank is asserted (logical 1) while also having an associated priority input (PI) asserted (logical 1). If any active input (AI) and its corresponding priority input (PI) are asserted for a bank, the corresponding OR gate 49 for that bank asserts (logical 1) on the priority sum input (PSI) to indicate that one or more active inputs having priority are present for that bank.

In response to an asserted priority sum input (PSI) in a bank, each comparator 48 in that bank functions to assert (as a logical 1) an active output (AO) only when the corresponding active input (AI) is asserted and the corresponding priority input (PI) is asserted. An asserted active output (AO) for one bank becomes an asserted active input (AI) for the next bank.

If the combination of at least one asserted active input (AI) and its corresponding asserted priority input (PI) is not present in a bank, then the priority sum input (PSI) for that bank is non-asserted (logical 0). In response to a non-asserted priority sum input (PSI) in a bank 46, each of the comparators 48 for that bank functions to cause its active output (AO) to be asserted if its active input (AI) is asserted and to cause its active output (AO) to be non-asserted if its active input (AI) is non-asserted.

In FIG. 6, the operation of the first comparator bank 46-0 is to determine whether any of the most significant bits on the priority in (PI) input lines 44-(0,0), 44-(1,0), ..., 44-(N-1,0) are asserted for any of the corresponding active in (AI) inputs 37-0, 37-1, ..., 37-(N-1) that are asserted, and if so asserted, a corresponding one of the active out (AO) outputs 40-(1,0), 40-(1,1), ..., 40-(1,N-1), respectively, is asserted. If none of the most significant bits on the priority in (PI) input lines 44-(0,0), 44-(1,0), ..., 44-(N-1,0) are asserted that correspond to the asserted active in (AI) lines, then each of the active in (AI) inputs 37-0, 37-1, ..., 37-(N-1) which is asserted produces an asserted active out (AO) on a corresponding one of the outputs 40-(1,0), 40-(1,1), ..., 40-(1,N-1), respectively.

In FIG. 6, the operation of the second comparator bank 46-1 is to determine whether any of the next most significant bits on the priority in (PI) input lines 44-(0,1), 44-(1,1), ..., 44-(N-1,1) are asserted for any of the corresponding active in (AI) inputs 40-(1,0), 40-(1,1), ..., 40-(1,N-1), respectively, that are asserted, and if so asserted, a corresponding one of the active out (AO) outputs 40-(2,0), 40-(2,1), ..., 40-(2,N-1), respectively, is asserted. If none of the next most significant bits on the priority in (PI) input lines 44-(0,1), 44-(1,1), ..., 44-(N-1,1) are asserted that correspond to the asserted active in (AI) lines, then each of the active in (AI) inputs 40-(1,0), 40-(1,1), ..., 40-(1,N-1), respectively, which is asserted produces an asserted active out (AO) on a corresponding one of the outputs 40-(2,0), 40-(2,1), ..., 40-(2,N-1), respectively.

In FIG. 6, the operation of each subsequent comparator bank is like that for banks 49-0 and 49-1. In summary, each of the banks 46-0 through 46-(L-1) examines asserted active in (AI) signals and corresponding priority in (PI) signals and depending upon priority responsively passes asserted active (AO) signals from bank to bank until the surviving asserted active out (AO) signals appear on the output lines 50-0, 50-1, ..., 50-(N-1).

In FIG. 6, for each of the input lines 37 which is asserted, there will be a corresponding one of the output lines 50 asserted for those lines having a corresponding priority tag equal to the highest level priority tag among any of the priority tags on the tag buses 35 corresponding to asserted active in (AI) lines 37. Accordingly, the output lines 50 can have from 0 to N lines asserted. If all N output lines 50 are asserted, then all active in (AI) lines 37 are asserted and the priority tags on each of the buses 35 are equal. If the number of output lines 50 asserted is less than the number of input lines 37 asserted, then the fewer number of asserted active out (AO) lines results because the non-asserted outputs correspond to lower priority tags on the buses 35.

Figure 8:
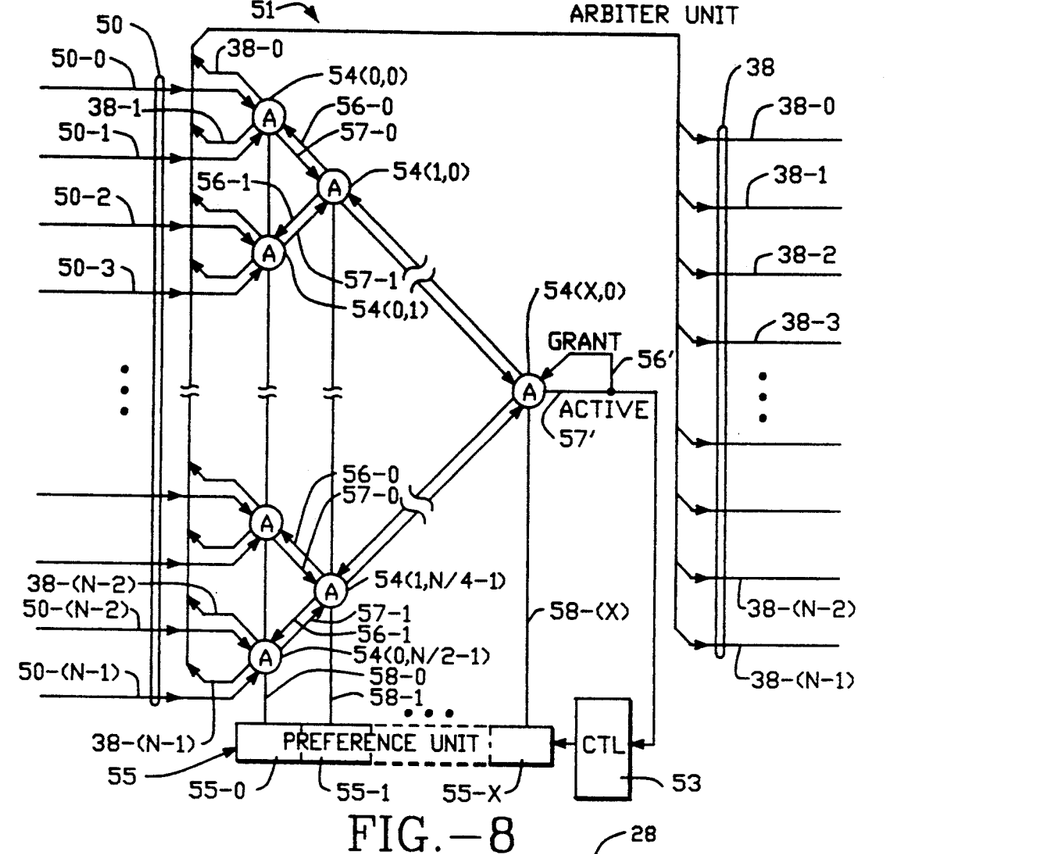
FIG. 8 depicts an arbiter unit which forms part of the determining unit of FIG. 4.

Arbiter Unit—FIG. 8

In FIG. 8, further details of the arbiter unit 51 of FIG. 4 are shown. The output lines 50 from the priority unit of FIG. 6 are input to the arbiter unit of FIG. 4. Specifically, the FIG. 4 arbiter unit has a binary tree structure in which the lines 50 from the priority unit of FIG. 6 are connected in pairs to input arbiter blocks 54. For example, the lines 50-0 and 50-1 are input to the arbiter block 54(0,0). The input lines 50-2 and 50-3 are input to the arbiter block 54(0,1). Similarly, the lines 50-(n-2) and 50-(N-1) are input to the arbiter block 54(0,N/2-1). These inputs 50 are forward input signals in pairs to the arbiter blocks 54. Each arbiter block 54 has two output reverse signals on the forward input side. For example, the arbiter block 54(0,0) has the reverse signals 38-0 and 38-1. In a similar manner, the arbiter block 54(0,N/2-1) has the reverse signals 38-(N-2) and 38-(N-1).

In FIG. 8, each arbiter block 54 also includes two signals on the forward output side including a forward output signal and a reverse input signal. For example, the arbiter block 54(0,0) includes a reverse signal input 56-0 and a forward signal output 57-0. In a similar manner, the arbiter block 54(0,1) includes a forward signal output 57-1 and a reverse signal input 56-1. The next bank of the tree structure of FIG. 8 again is like the first bank. For example, in the second bank, the arbiter block 54(1,0) includes two forward inputs, 57-0 and 57-1, and two reverse outputs, 56-0 and 56-1.

Similarly, the arbiter block 54(1,0) has both a forward output and reverse input. The arbiter blocks are connected in binary stages as shown in FIG. 8 until the last arbiter block 54(x,0). The arbiter block 54(x,0) has a forward output 57' which is connected to the reverse input 56'. Reverse input 56' connects back through all the reverse signal paths to activate one and only one of the reverse outputs 38 from one of the arbiter blocks 54(0,0), ..., 54(0,N/2-1) in the first stage 54(0,-) of the FIG. 8 tree.

Each of the arbiter blocks in FIG. 8 also receives a preference unit input which determines which of two forward active inputs at any stage is selected for the single output. Specifically, the stage 55-0 output from the preference unit 55 provides an input to each of the first stage arbiter blocks 54(0,0), ..., 54(0,N/2-1). For the arbiter block 54(0,0), either the input line 50-0 or the input line 50-1 will be connected, if both are active, as the forward output 57-0 as a function of the logical state (logical 1 or logical 0) of the preference counter stage 55-0. Similarly, either the forward input 57-0 or 57-1 from the arbiter block 54(1,0), if both are active, will be selected as the forward output as function of the logical state of the second counter stage 55-1. Finally, the last stage, represented by the arbiter block 54(x,0) has its output 56, controlled by the last stage 55-x of the preference counter 55. The preference counter 55 is changed only after an active signal is output on line 56 and after the return signals have been transmitted to the output lines 38.

Control 53, in one embodiment, includes a random number generator for randomly setting the preference unit 55 outputs so that arbitration through the arbiter unit of FIG. 8 is on a random basis.

Each of the arbiter blocks 54 selects the forward output between the competing two inputs based on the preference counter value only if both inputs to the arbiter block are asserted. If only one input is asserted, then the asserted one on the input is the selected output. If neither of the inputs to an arbiter block are asserted, then the forward output from an arbiter block is not asserted. In this manner, the arbiter unit of FIG. 8 selects one and only one of the competing inputs as a selected output by asserting one of the output lines 38. For example, if the input line 50-1 is asserted and becomes selected by the arbiter unit, the output line 38-1 is correspondingly asserted.

TABLE 2

| Case | FI0 | FI1 | FO | RI | RO0 | RO1 | PS |
|------|-----|-----|----|----|-----|-----|----|
| 1 | 1 | 0 | 1 | 1 | 1 | 0 | −2 |
| 0 | 1 | 1 | 1 | 0 | 1 | — | |
| 3 | 1 | 1 | 1 | 1 | 1 | 0 | 1 |
| 4 | 1 | 1 | 1 | 1 | 0 | 1 | 0 |
| 5 | 0 | 0 | 0 | 0 | 0 | 0 | — |

The logical operation of the arbiter block 54 of FIG. 8 is represented in TABLE 2. In TABLE 2, case 1, the forward input 0 (FI0) on the ACTIVE line 50-0 is a logical one and the forward input 1 (FI1 on the ACTIVE line 50-1 is a logical zero. Under this condition the OR gate 75 produces the forward out (FO) signal on the ACTIVE line 57-0.

In case 1 under the condition that a reverse input (RI) is a logical one on the GRANT line 56-0, then logic block 76 provides a logical one output irrespective of the logical one or zero state of the preference signal on line 58-0. The logical one from logic circuit 76 together with the one on the RI GRANT line 56-0 satisfies AND gate 70 so that the reverse output zero (RO0) GRANT line 38-0 is a logical one. Invertor 72 causes AND gate 71 not to be satisfied so that the reverse out 1 (RO) GRANT line 38-1 is a logical zero.

In case 2 of TABLE 2, the forward input 0 (FI0) ACTIVE line 50-0 is a logical zero and the forward input 1 (FI1) ACTIVE line 50-1 is a logical one. With these inputs, the logic block 28 causes the corresponding reverse output RO1 on the GRANT line 38-1, corresponding to the ACTIVE line 50-1, to be a logical one while the reverse output (RO0) from GRANT line 38-0 to be a logical zero.

Case 1 and case 2 of TABLE 2 indicate that, in the case where only one forward input is active, the corresponding reverse output is the one selected whenever a reverse input (RI) is present on the GRANT line 56-0.

Referring to TABLE 2, cases 3 and 4 represent the condition where more than one forward input is present, that is, both FI0 and FI1 are logical one. When a reverse input (RI) is present, then the selected ones of the reverse outputs is a function of the preference signal PS on the line 58-0. When the preference signal is a logical one, then the reverse output (RO0) is a logical one and when the preference signal (PS) is a logical zero, then the RO1 is a logical one.

In one embodiment, the preference signal on line 58-0 can be fixed to a preassigned value so that preference is always given to a particular one of the reverse outputs (RO0 or RO1) whenever both of the forward inputs (FI0 and FI1) are asserted.

In the preferred embodiment, however, the preference signal on line 58-0 is determined by the value in the preference counter 55 of FIG. 8.

Case 5 represents the condition where neither forward input is asserted, that is, FI0 and FI1 are logical zeros. Under this condition the forward output (FO) is a logical zero and hence the reverse input (RI) is a logical zero. With a logical zero on the reverse input on the GRANT line 56-0, neither of the AND gates 70 or 71 is satisfied and hence both RO0 and RO1 are logical zeros and the state of the preference signal (PS) is irrelevant.

FIG. 8 depicts an arbiter unit for selecting one of a plurality of competing input signals from lines 50. The plurality of stages 54(0,-), 54(1,-), . . . , 54(x,-) of arbiter blocks 54 are cascaded together from arbiter blocks in a first stage 54(0,-) to arbiter blocks in a last stage 54(x,0).

In the arbiter unit of FIG. 8, the number of forward outputs 57 and the number of reverse inputs 56 for each stage from the first stage 54(0,-) to the last stage 54(x,0) is reduced until only a single forward output 56, and a single reverse input 57' exist for the last stage 54(x,0), and the single forward output 56' connects to said single reverse input 57'.

For said arbiter unit of FIG. 8, input signals at forward inputs 50 of the first stage 54(0,-) are propagated in a forward direction to cause a single forward output signal to be output from the single forward output 57' of the last stage 54(x,0), whereby the single forward output signal, connected as the single reverse input signal at the single reverse input 56' of the last stage 54(x,0), is propagated in the reverse direction, from the last stage 54(x,0) to the first stage 54(0,-), to cause a selection signal to be output from one reverse output 38 for one arbiter block 54 in the first stage 54(0,-) thereby selecting one of the plurality of competing input signals.

Figure 9:
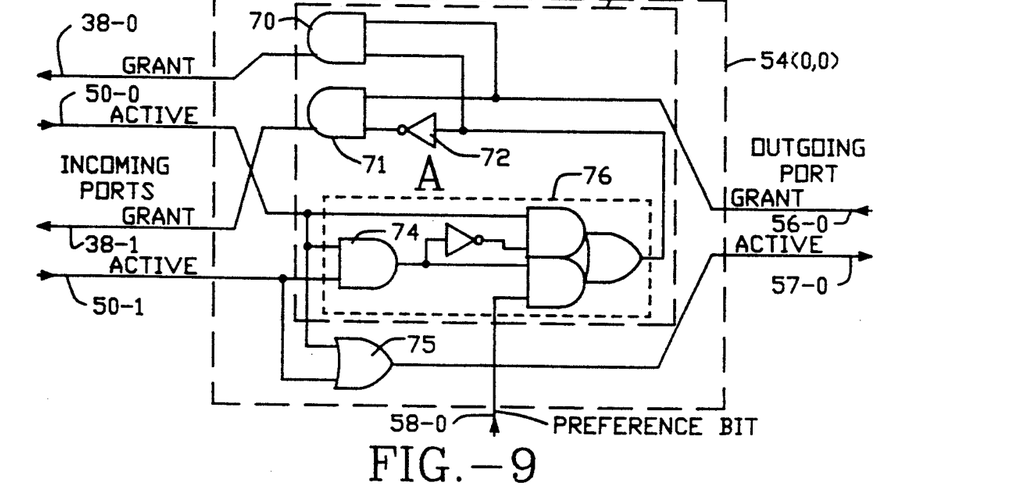
FIG. 9 depicts a typical one of the arbitration blocks which are employed in the arbiter unit of FIG. 8.

Arbiter Block - FIG. 9

In FIG. 9, arbiter block 54(0,0) of FIG. 8 is shown as typical of all of the arbiter blocks 54 in FIG. 8. In FIG. 9, the input lines 50-0 and 50-1 are the forward inputs which are asserted as active signals when the corresponding outputs from the priority unit of FIG. 6 are asserted. The reverse inputs on lines 38-0 and 38-1 connect as the lines of the output bus 38. The input lines 50-0 and 50-1 each connect to the AND gate 74 and to the OR gate 75. If either of the inputs 50-0 or 50-1 is asserted, then the output on 57-0 is asserted and if neither of the inputs is asserted, then the output 57-0 is not asserted.

If one or the other of the inputs 50-0 or 50-1 is asserted, but not both, then the corresponding AND gate 70 or 71 will be enabled by the output from logic block 76. If both of the inputs 50-0 and 50-1 are asserted, the AND gate 74 in logic block 76 is satisfied so that the selection of which one of the AND gates 70 or 71 will be enabled is a function of the preference bit 58-0 from counter 55 of FIG. 8.

In FIG. 8, each arbiter block 54 has forward means including OR gate 75 including a plurality of forward inputs 50-0 and 50-1 for receiving said competing input signals and a forward output 57-0 for providing a forward output signal in response to any one of the input signals. Each arbiter block 54 also includes reverse means logic block 28 including a reverse input 56-0 for receiving a reverse input signal, a plurality of reverse outputs 38-0 and 38-1 for providing reverse output signals, and reverse selection means gates 70 and 71 including reverse enable means grant line 56-0 for enabling one of said reverse outputs in response to receipt of a reverse input signal.

Each arbiter block 54 includes connection means lines 56 and 57 connecting the plurality of stages in a binary tree wherein the forward outputs 57 from blocks 54 in one stage 54(0,-) connect as forward inputs 57 to blocks 54 in a next stage 54(1,-) and reverse outputs 56 from blocks 54 in one stage 54(1,-) connect as reverse inputs 56 to blocks 54 in a previous stage 54(0,-).

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arbiter unit for selecting one of a plurality of competing input signals comprising:
   a plurality of stages of arbiter blocks cascaded together from arbiter blocks in a first stage to arbiter blocks in a last stage, each arbiter block having,
   forward means for sensing one or more forward input signals to provide a forward output signal,
   reverse means for propagating a single reverse output signal in response to a reverse input signal,
   logic means to select said single reverse output in response to a preference signal, a preference unit for providing preference signals to said arbiter blocks, connection means connecting said plurality of stages in a tree wherein the forward output signals from blocks in one stage connect as forward input signals to blocks in a next stage, wherein reverse output signals from blocks in one stage connect as reverse input signals to blocks in a previous stage, and wherein only a single forward output signal connects to a single reverse input signal for said last stage, whereby, for said arbiter unit, said competing input signals to the first stage cause propagation in the forward direction and enable propagation in the reverse direction through said stages providing one reverse output signal from one arbiter block in said first stage thereby selecting one of the plurality of competing input signals.

2. An arbiter unit for selecting one of a plurality of competing input signals comprising:

a plurality of stages of arbiter blocks cascaded together from arbiter blocks in a first stage to arbiter blocks in a last stage, each arbiter block having, forward means including a plurality of forward inputs for receiving said competing input signals and a forward output for providing a forward output signal in response to any one of said input signals, reverse means including a reverse input for receiving a reverse input signal, a plurality of reverse outputs for providing reverse output signals, and reverse selection means including reverse enable means for enabling one of said reverse outputs in response to receipt of a reverse input signal, said reverse selection means for each block including logic means responsive to a single forward input signal for selecting a corresponding single reverse output and responsive to more than one forward input signal to select a single reverse output in response to a preference signal, a preference unit for providing preference signals to said arbiter blocks, connection means connecting said plurality of stages in a tree wherein, the forward outputs from blocks in one stage connect as forward inputs to blocks in a next stage and reverse outputs from blocks in one stage connect as reverse inputs to blocks in a previous stage, the number of forward outputs and the number of reverse inputs for each stage from the first stage to the last stage is reduced until only a single forward output and a single reverse input exist for said last stage, and said single forward output connects to said single reverse input, whereby, for said arbiter unit, input signals at forward inputs of the first stage are propagated in a forward direction to cause a single forward output signal to be output from the single forward output of the last stage, and whereby the single forward output signal, connected as the single reverse input signal at the single reverse input of the last stage, is propagated in the reverse direction, from the last stage to the first stage, to cause a selection signal to be output from one reverse output for one arbiter block in said first stage thereby selecting one of the plurality of competing input signals.

3. The arbiter unit of claim 2 wherein said preference unit is a counter having a plurality of counter stages, one stage for each of said stages of arbiter blocks, each stage providing a preference signal for the arbiter blocks in a corresponding stage of arbiter blocks.

4. The arbiter unit of claim 3 wherein said counter is incremented to change preference signals each time a single reverse output is propagated from an arbiter block in said first stage.

5. The arbiter unit of claim 2 wherein said preference unit includes, a plurality of preference stages, one stage for each of said stages of arbiter blocks, each preference stage providing a preference signal for the arbiter blocks in the corresponding stage of arbiter blocks, control means for changing the state of said preference stages and corresponding preference signals each time a single reverse output is propagated from an arbiter block in said first stage of arbiter blocks.

6. The arbiter unit of claim 5 wherein said control means changes the stage of said preference stages so as to tend to randomly select single reverse outputs from said first stage of arbiter blocks from among the forward inputs to said first stage of arbiter blocks.

7. The arbiter unit of claim 2 wherein said arbiter blocks and said connection means are formed of latch-free circuitry for high speed operation.

8. The arbiter unit of claim 2 wherein, for each arbiter block, the number of forward inputs and the number of reverse outputs is equal to two whereby said stages are connected to form a binary tree.

9. The arbiter unit of claim 2 wherein said arbiter unit includes, a plurality of output latches, one latch for each reverse output from said first stage, timing control means for latching the reverse outputs from said first stage over a first time interval in order to latch selection signals from said arbiter unit.

10. The arbiter unit of claim 9 wherein said arbiter unit includes a plurality of input gates controlled by said output latches whereby inputs to said arbiter unit are inhibited while outputs are latched in said output latches.

11. The arbiter unit of claim 2 wherein said arbiter unit includes, a plurality of output latches, one latch for each reverse output from said first stage, a plurality of input gates for receiving corresponding input signals to said arbiter unit, said input gates controlled by said output latches whereby inputs to said arbiter unit are inhibited while outputs are latched in said output latches, timing control means having latch output means for latching the reverse outputs from said first stage over a first time interval in order to latch selection signals from said arbiter unit and having reset output means for resetting said latches after said first time interval.

12. In a computer system including a plurality of computer units connected together by a common bus wherein each computer unit includes a request output for providing a bus request input signal which requests access to said bus, and a grant input for receiving a grant selection signal which authorizes access to said bus, an arbiter unit for selecting one of a plurality of competing bus request input signals from the computer units comprising:
- a plurality of stages of arbiter blocks cascaded together from arbiter blocks in a first stage to arbiter blocks in a last stage, each arbiter block having,
  - a plurality of forward inputs for receiving the bus request input signals from the computer units,
  - a forward output for providing a forward output signal in response to any one of said input signals,
  - a reverse input for receiving a reverse input signal,
  - a plurality of reverse outputs for providing reverse output signals,
  - reverse selection means including reverse enable means for enabling one of said reverse outputs in response to receipt of a reverse input signal, said reverse selection means for each block including logic means responsive to a single forward input signal for selecting a corresponding single reverse output and responsive to more than one forward input signal to select a single reverse output in response to a preference signal,
- a preference unit for providing signals to said arbiter blocks,
- connection means connecting said plurality of stages in a tree such that the number of forward outputs and the number of reverse inputs for each stage from the first stage to the last stage is reduced until, for said last stage, a single forward output connects to a single reverse input,
- whereby, in said computer system, a plurality of bus request input signals from the computer units requesting access to said bus are propagated by the arbiter unit to provide a grant selection signal, when a reverse input signal is present, which authorizes one of said computer units to have access to said bus.

13. In a self-routing communication system for switching packet input signals with tags where the communication system includes a plurality of packet inputs and a plurality of packet outputs and where a plurality of competing packet input signals compete for the packet outputs, an improved arbiter unit for selecting packet signals from one of the plurality of competing packet inputs for connection to a packet output comprising:
- a plurality of stages of arbiter blocks cascaded together from arbiter blocks in a first stage to arbiter blocks in a last stage, each arbiter block having,
  - a plurality of forward inputs for receiving packet signals from said packet units,
  - a forward output for providing a forward output signal in response to packet input signals from any one of the packet inputs,
  - a reverse input for receiving a reverse input signal,
  - a plurality of reverse outputs for providing reverse output signals,
  - reverse selection means including reverse enable means for enabling one of said reverse outputs in response to receipt of a reverse input signal, said reverse selection means for each block including logic means responsive to a single forward input signal for selecting a corresponding single reverse output and responsive to more than one forward input signal to select a single reverse output in response to a preference signal,
- a preference unit for providing signals to said arbiter blocks,
- connection means connecting said plurality of stages in a tree such that the number of forward outputs and the number of reverse inputs for each stage from the first stage to the last stage is reduced until, for said last stage, a single forward output connects to a single reverse input,
- whereby, in said communication system, a plurality of packet input signals from the packet inputs are propagated by the arbiter unit to provide a selection signal which selects one of said packet inputs for connection to a packet output.

14. The arbiter unit of claim 13 wherein said preference unit is a counter having a plurality of counter stages, one stage for each of stages of arbiter blocks, each stage providing a preference signal for the arbiter blocks in a corresponding stage of arbiter blocks.

15. The arbiter unit of claim 14 wherein said counter is incremented to change preference signals each time a single reverse output is propagated from an arbiter block in said first stage.

16. The arbiter unit of claim 13 wherein said preference unit includes,
- a plurality of preference stages, one stage for each of said stages of arbiter blocks, each preference stage providing a preference signal for the arbiter blocks in the corresponding stage of arbiter blocks,
- control means for changing the state of said preference stages and corresponding preference signals each time a single reverse output is propagated from an arbiter block in said first stage of arbiter blocks.

17. The arbiter unit of claim 16 wherein said control means changes the stage of said preference stages so as to tend to randomly select single reverse outputs from said first stage of arbiter blocks from among the forward inputs to said first stage of arbiter blocks.

18. The arbiter unit of claim 13 wherein said arbiter blocks and said connection means are formed of latch-free circuitry for high speed operation.

19. The arbiter unit of claim 13 wherein, for each arbiter block, the number of forward inputs and the number of reverse outputs is equal to two whereby said stages are connected to form a binary tree.

20. The arbiter unit of claim 13 wherein said arbiter unit includes,
- a plurality of output latches, one latch for each reverse output from said first stage,
- timing control means for latching the reverse outputs from said first stage over a first time interval in order to latch selection signals from said arbiter unit.

21. The arbiter unit of claim 13 wherein said arbiter unit includes a plurality of input gates controlled by said output latches whereby inputs to said arbiter unit are inhibited while outputs are latched in said output latches.

22. A determining unit including an arbiter unit for selecting one of a plurality of competing input signals comprising:
- a priority unit for receiving the competing input signals and priority signals for the competing input signals, said priority unit having means for providing prioritized signals of the same priority level as the said input signals at said forward inputs of the first stage whereby said arbiter unit selects only from competing input signals of the same priority level, a plurality of stages of arbiter blocks cascaded together from arbiter blocks in a first stage to arbiter blocks in a last stage, each arbiter block having, forward means for sensing one or more input signals to provide a forward output signal, reverse means for propagating a single reverse output signal in response to a reverse input signal, connection means connecting said plurality of stages in a tree with said competing input signals connected at said forward inputs of the first stage whereby said arbiter unit selects only from competing input signals of the same priority level and wherein the number of forward outputs and the number of reverse inputs for each stage from the first stage to the last stage is reduced until a single forward output connects to a single reverse input for said last stage and wherein said single forward output connects to said single reverse input, whereby input signals at forward inputs of the first stage are propagated to enable a selection signal to be output from one reverse output for one arbiter block in said first stage.

23. A determining unit for selecting one of a plurality of competing input signals where each input signal has a priority value represented by a priority signal comprising:

a priority unit including, a plurality of signal inputs for receiving said input signals, a plurality of priority inputs for receiving said priority signals, a plurality of AND stages, one AND stage for each of said signal inputs, each AND stage having a plurality of AND gates enabled by a corresponding one of the signal inputs, each AND gate receiving a corresponding one of said priority inputs, each AND gate having an AND output asserted when the corresponding input signal and priority signal are asserted, a plurality of OR gates one for each stage of comparators, each OR gate receiving an AND gate output from a corresponding one of the AND gates in each AND gate stage to provide an asserted OR gate output whenever any of the received AND gate outputs are asserted, a plurality of comparator stages, each comparator stage including a comparator for each signal input for receiving as inputs a comparator input and a corresponding OR gate output, said comparator stages cascaded from a first stage to a last stage wherein said first stage receives said signal inputs as said comparator inputs and compares them with OR outputs to form comparator outputs, and the comparator outputs from one stage form the comparator inputs for the next stage, until the comparator outputs from said last stage form prioritized signals representing competing prioritized input signals of the same priority level, an arbiter unit including, a plurality of stages of arbiter blocks cascaded together from arbiter blocks in a first stage to arbiter blocks in a last stage, each arbiter block having, a plurality of forward inputs for receiving said competing prioritized input signals, a forward output for providing a forward output signal in response to any one of said prioritized input signals, a reverse input for receiving a reverse input signal, a plurality of reverse outputs for providing reverse outputs signals, reverse selection means including reverse enable means for enabling one of said reverse outputs in response to receipt of a reverse input signal, connection means connecting said plurality of stages in a tree wherein, the forward outputs from blocks in one stage connect as forward inputs to blocks in a next stage and reverse outputs from blocks in one stage connect as reverse inputs to blocks in a previous stage, the number of forward outputs and the number of reverse inputs for each stage from the first stage to the last stage is reduced until only a single forward output and a single reverse input exist for said last stage, and said single forward output connects to said single reverse input, whereby, for said arbiter unit, prioritized input signals at forward inputs of the first stage are propagated in a forward direction to cause a single forward output signal to be output from the single forward output of the last stage, and whereby the single forward output signal, connected as the single reverse input signal at the single reverse input of the last stage, is propagated in the reverse direction, from the last stage to the first stage, to cause a selection signal to be output from one reverse output for one arbiter block in said first stage thereby selecting one of the plurality of competing prioritized input signals.

24. A determining unit for selecting one of a plurality of competing input signals where each input signal has a priority value represented by a priority signal comprising:

a priority unit for receiving the competing input signals and the priority signals and providing prioritized input signals including only input signals of the same priority level, an arbiter unit including, a plurality of stages of arbiter blocks cascaded together from arbiter blocks in a first stage to arbiter blocks in a last stage, each arbiter block having, a plurality of forward inputs for receiving said competing prioritized input signals, a forward output for providing a forward output signal in response to any one of said prioritized input signals, a reverse input for receiving a reverse input signal, a plurality of reverse outputs for providing reverse outputs signals, reverse selection means including reverse enable means for enabling one of said reverse outputs in response to receipt of a reverse input signal, connection means connecting said plurality of stages in a tree wherein, the forward outputs from blocks in one stage connect as forward inputs to blocks in a next stage and reverse outputs from blocks in one stage connect as reverse inputs to blocks in a previous stage, the number of forward outputs and the number of reverse inputs for each stage from the first stage to the last stage is reduced until only a single forward output and a single reverse input exist for said last stage, and said single forward output connects to said single reverse input, whereby, for said arbiter unit, prioritized input signals at forward inputs of the first stage are propagated in a forward direction to cause a single forward output signal to be output from the single forward output of the last stage, and whereby the single forward output signal, connected as the single reverse input signal at the single reverse input of the last stage, is propagated in the reverse direction, from the last stage to the first stage, to cause a selection signal to be output from one reverse output for one arbiter block in said first stage thereby selecting one of the plurality of competing prioritized input signals.

25. An arbiter unit for selecting one of a plurality of competing input signals comprising:

a plurality of stages of arbiter blocks cascaded together from arbiter blocks in a first stage to arbiter blocks in a last stage, each arbiter block having,
two forward inputs for receiving two input signals,
a forward output for providing a forward output signal in response to either of said input signals,
a reverse input for receiving a reverse input signal,
two reverse outputs for providing reverse output signals,
reverse selection means including reverse enable means for enabling one of said reverse outputs in response to receipt of a reverse input signal, said reverse selection means for each block including logic means responsive to a single reverse output and responsive to more than one forward input signal to select a single reverse output in response to a preference signal, a preference unit for providing preference signals to said arbiter blocks, connection means connecting said plurality of stages in a binary tree wherein,
the forward outputs from blocks in one stage connect in pairs as forward inputs to blocks in a next stage and reverse outputs from blocks in one stage connect in pairs as reverse inputs to blocks in a previous stage,
the number of forward outputs and the number of reverse inputs for each stage from the first stage to the last stage is reduced until only a single forward output and a single reverse input exist for said last stage, and
said single forward output connects to said single reverse input, whereby, for said arbiter unit, competing input signals at forward inputs of the first stage are propagated in a forward direction to cause a single forward output signal to be output from the single forward output of the last stage, and whereby the single forward output signal, connected as the single reverse input signal at the single reverse input of the last stage, is propagated in the reverse direction, from the last stage to the first stage, to cause a selection signal to be output from one reverse output for one arbiter block in said first stage thereby selecting one of the plurality of competing input signals.

* * * * *